United States Patent [19]
Fabozzi, II

[11] Patent Number: 6,085,251
[45] Date of Patent: Jul. 4, 2000

[54] IMPLEMENTING A PARALLEL FILE TRANSFER PROTOCOL

[75] Inventor: Donald Joseph Fabozzi, II, Kihei, Hi.

[73] Assignee: The United States of America as represented by the Secretary of the Air Force, Washington, D.C.

[21] Appl. No.: 09/054,159

[22] Filed: Apr. 2, 1998

[51] Int. Cl.[7] .................................................. G06F 15/16
[52] U.S. Cl. ...................... 709/230; 709/203; 709/237; 709/101; 709/217; 709/219; 714/748; 714/820; 714/15; 714/20
[58] Field of Search .................................... 709/203, 202, 709/206, 237, 230; 714/15, 18, 748, 820; 710/1

[56] References Cited

U.S. PATENT DOCUMENTS

| | | | |
|---|---|---|---|
| 5,440,551 | 8/1995 | Suzuki | 370/395 |
| 5,553,083 | 9/1996 | Miller | 714/748 |
| 5,727,002 | 3/1998 | Miller et al. | 714/748 |

OTHER PUBLICATIONS

"Xpress Transport Protocol Specification", XTP 4.0, Mar. 1, 1995, Sandia Labs.

Primary Examiner—Kevin J. Teska
Assistant Examiner—William D. Thomson
Attorney, Agent, or Firm—Harold L. Burstyn

[57] ABSTRACT

Apparatus and method to improve the speed of electronic file transfer between remote computers by parallel processing. The most common transfer protocol is the File Transfer Protocol (FTP) Though the Internet is the most popular means by which users electronically transport data, the Internet's Transport Control Protocol/Internet Protocol ("TCP/IP") model, upon which FTP operates, does not adequately support the transfer of large data sets over long distances. Typical transfers between distant sites linked via the Internet have throughputs of about 20 Kilobytes per second ("Kb/sec") or less, and they are prone to dropping packets or losing connections. Making FTP parallel makes transfers up to five times faster, that is, it offers transfer rates of up to 100 Kb/sec. FTP is operated in parallel by segmenting a file into discrete packets, simultaneously transmitting these packets to the receiving computer, and reassembling the packets into the original file. A log file that is independent of the packets and separately transmitted can aid reassembly.

6 Claims, 3 Drawing Sheets

IMPLEMENTING A PARALLEL FILE TRANSFER PROTOCOL

STATEMENT OF GOVERNMENT INTEREST

The invention described herein may be manufactured and used by or for the Government for governmental purposes without the payment of any royalty thereon.

BACKGROUND OF THE INVENTION

The present invention relates to transferring data files between geographically separated computers, and, in particular, to implementing a Parallel File Transfer Protocol to transfer such files more rapidly than current methods permit.

The prevailing method by which users transport information between geographically separated computers is to use the File Transport Protocol ("FTP") to send the information over the Internet. This method, however, makes it difficult to transfer large data files across long distances over the Internet because of small window size and propagation delay.

Of the many protocols available for transferring files, TCP/IP (which stands for Transmission Control Protocol/Internet Protocol) is the one most widely accepted for the Internet. TCP ensures reliable transfers by transmitting data in separate packets. Each packet contains no more than 64 kilobytes ("Kb"). A "sliding window" or "handshake" protocol partitions the transmission into three distinct phases. The first phase represents data ready to be sent. The second phase represents data that is either in transit or has arrived but has not yet been acknowledged. The third phase represents data that arrived successfully and has been acknowledged (See A. S. Tanenbaum, *Computer Networks*, Englewood Cliffs, N.J., Prentice Hall, at 429 and J. Postel and J. Reynolds, "File Transfer Protocol (FTP), RFC 959", USC ISI, October 1988). Thus a 256 Kb file is broken into four 64 Kb packets, each of which passes sequentially through all three phases.

This mode supports transfers of small files. Though it transfers large files successfully between sites in close proximity, it degrades when transporting large files over long distances. There is a drop in throughput that results from two limitations. First, the bandwidth on the lines is limited. Second, the "pipe" between sites is not fully utilized. The sending machine could transmit much more data in the time it loses waiting for acknowledgments. These acknowledgments are checksums returned from the receiver to verify correct delivery of each packet sent.

An ideal transmission would stream data, error free, to arrive as quickly as it is sent, keeping the line fully occupied. In reality, however, much transfer time is wasted, because Internet errors dictate that the operation must transfer the data in very small packets sent in lock step. Each packet has to wait until the previous packet has been transmitted successfully and the successful transmission acknowledged. Thus the transfer has been drastically slowed down.

Two prior-art implementations have tried to solve these problems. Multiple File Transfer Protocol ("MFTP"), by Iannuci and Lekashman at NASA, provides (1) multiple connections between the client and the server and (2) variable window sizes. This solution, available only by request, requires the server to have the MFTP daemon running continuously. Users must also execute MFTP "clients" to transport data to/from the server. Though the client can be compiled and executed by a system user, the server must be compiled and installed only by a user who has system root privileges. As the MFTP server is an add-on to Unix Internet services, it requires that the Unix operating system be installed and running on the server.

A second solution to the problems of transferring large files over long distances is Starburst Multicast File Transfer Protocol™ ("SMFTP") from Starburst Communications. SMFTP provides both one-to-one and one-to-many (multicast) transmissions. SMFTP has two design differences from MFTP:

1. The transmission process is offloaded to a Multicast server that replicates and transmits the data.

2. The transmission window is extended to the entire length of the file. Error correction follows transmission of the complete file. SMFTP also requires the user to install a server (as root) and various clients who wish to transport to or from the server.

Neither of these prior-art solutions is satisfactory. MFTP requires that the MFTP server must exist on any server from which a user wishes to transport a file. And MFTP is neither standardized nor embraced by vendors of Unix workstations. Until MFTP is standardized and accepted by the Unix community, MFTP cannot be a general solution to the file-transfer problem, because MFTP must be "root" installed into a system's Internet service. Any security-conscious network administrator will object to the installation of any non-standardized third-party Internet services software for fear of hidden or unknown entry points that can compromise the system.

SMFTP also requires "root" installation into a system's Internet services. Thus both these prior-art solutions require that a separate server be installed at every site from or to which the user wishes to transfer data. Therefore they are acceptable only to a distributed commercial organization willing to make such an installation. Neither offers an acceptable solution for the mainstream of users, since the number of public sites running either MFTP or SMFTP servers is almost negligible.

Thus there exists a need for a solution to the problem of transferring large files over long distances that does not require a proprietary installation.

SUMMARY OF THE INVENTION

One object of the present invention is to provide a method for transferring large files expeditiously over long distances.

A further object of the present invention is to provide a method for transferring large files expeditiously over long distances without requiring a proprietary installation.

Another object of the present invention is to provide a method for transferring large files expeditiously over long distances that makes use of standard and readily available protocols.

Briefly stated, the present invention transfers large files expeditiously over long distances by making use of the FTP application, a standard application native to every Unix workstation. In the apparatus and method of the present invention, the data to be transmitted from a host computer is segmented into separate packets that are transmitted in simultaneous FTP sessions, and the separated packets are recombined at the receiving computer. The separation phase of the process divides the data into individual parts and leaves behind a separation/combination log. This log specifies (1) the number of pieces; (2) how the pieces should be ordered when they are combined to form the original after transmission; and (3) the method used to segment the data.

The simultaneous FTP sessions are carried out by a combination of automating each FTP session and processing, that is, segmenting and recombining, in the background.

According to an embodiment of the invention, a method for transferring files between remote computers, comprises the steps of segmenting into a plurality of packets a file to be transmitted to a remote receiving system; transmitting the plurality of packets substantially simultaneously to a remote receiving system; and recombining the plurality of packets into the file at the remote receiving system.

According to a feature of the invention, a method of transferring files over a network, comprising the steps of creating a log for a file; segmenting data from the file into a plurality of packets; identifying each of the plurality of packets; recording in the log information to identify each of the plurality of packets and its order in the file; invoking a simultaneous file transfer algorithm at a remote receiving location; transmitting the log to the remote receiving location; analyzing the log at the remote receiving location to identify each of the packets and its order in the file; transmitting the packets substantially simultaneously to the remote receiving location; and recombining the packets into the file.

According to another feature of the invention, a system for transferring files between remote computers comprises means for segmenting into a plurality of packets a file to be transmitted to a remote receiving system; means for transmitting the plurality of packets substantially simultaneously to a remote receiving system; and means for recombining the plurality of packets into the file at the remote receiving system.

According to still another feature of the invention, a method for transferring files between remote computers using the File Transfer Protocol (FTP), comprises segmenting into a plurality of data packets a file to be transmitted to a remote receiving system; recording in a log (1) information identifying each of the plurality of data packets and its order in the file, (2) server identification, and (3) methods of segmenting and recombining the file; invoking it a remote computer a client utility effective for simultaneous FTP transfers; transmitting the log to the remote computer; analyzing the log at the remote computer; transmitting substantially simultaneously the plurality of data packets to the remote system using simultaneous FTP; and recombining the data packets according to the information and converting the data packets into the file's original form by means of the methods of segmenting and recombining.

These and many other objects and advantages of the present invention will be readily apparent to one skilled in the pertinent art from the following detailed description of a preferred embodiment of the invention and the related drawings.

DESCRIPTION OF THE PREFERRED EMBODIMENT

Figure 1:
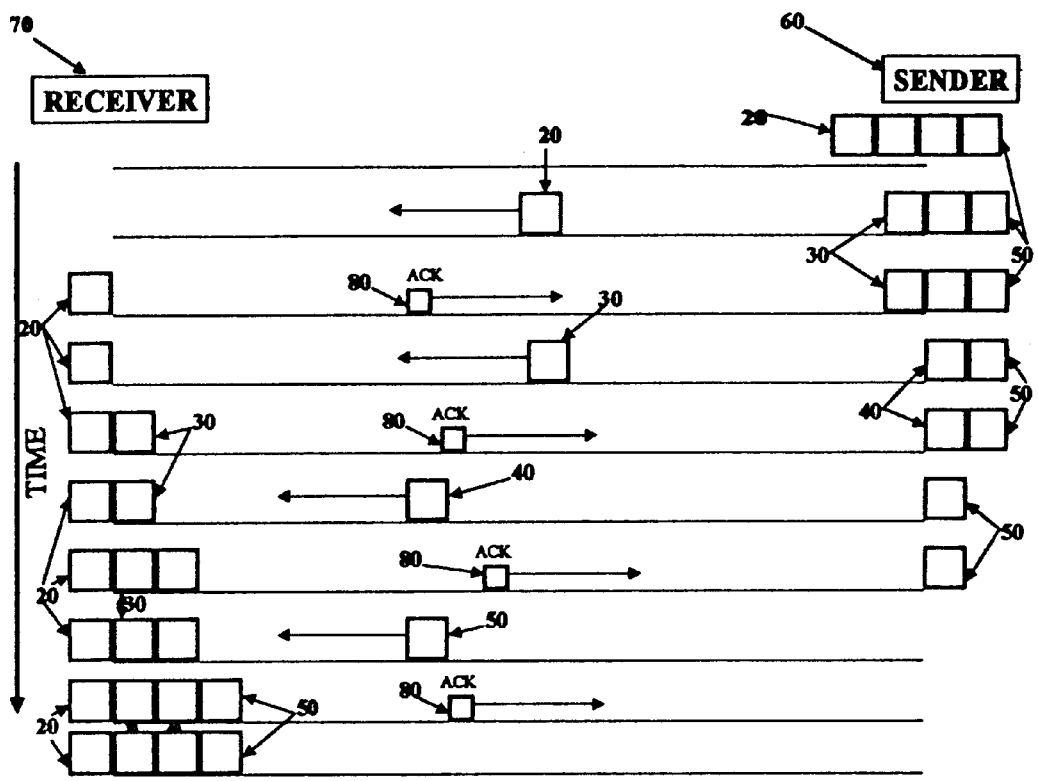
FIG. 1 shows a simplified view of a 256 Kb FTP transfer as conventionally performed by a serial method.

Referring to FIG. 1, in the conventional serial transfer of a file using FTP, a 256 Kb file 10 comprises four 64 Kb packets 20, 30, 40, and 50. A sender 60 transmits packet 20 to a receiver 70. When receiver 70 has received packet 20, it sends an acknowledgment signal ("ACK") 80 to sender 60. The same procedure is followed with packets 30, 40, and 50. When sender 60 has received ACK 80 for the final packet 50, the transmission is complete, as receiver 70 now holds reassembled 256 Kb file 10.

Each one of packets 20, 30, 40, and 50 must be acknowledged before the next packet can be sent. The transfer of file 10 therefore takes substantial time, especially if the distance between sender 60 and receiver 70 is great and/or the line connecting them is noisy. Much more data could be transmitted in the time spent waiting for acknowledgments. Delays caused by repeated transmissions until the acknowledgment is received cause substantial loss of efficiency, especially if file 10 is substantially larger than 256 Kb, as most transmitted files are. Much time is wasted because Internet errors require that the transfer be in very small packets. Each packet must wait until the previous packet has been transmitted successfully.

In an ideal transmission, data would stream, error free, arriving as quickly as it is sent, thus keeping the line fully occupied. This ideal can be approximated by the apparatus and method of the present invention.

Figure 2:
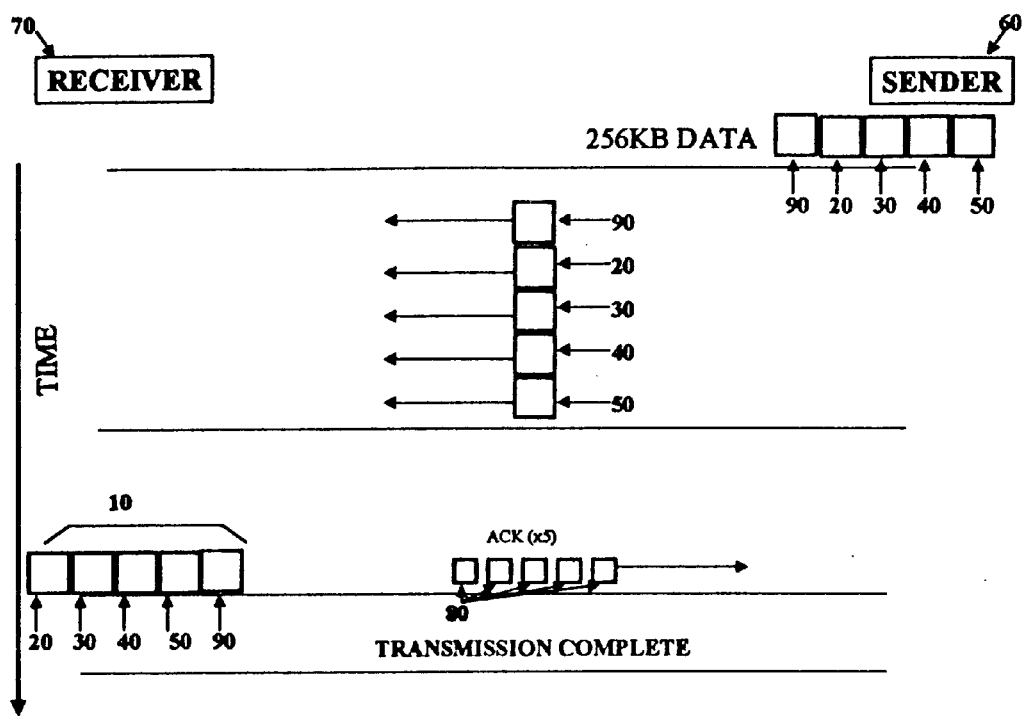
FIG. 2 shows a simplified view of a 256 Kb FTP transfer as performed by the method of the present invention.

Referring to FIG. 2, 256 Kb file 10 can be transferred through parallel FTP sessions. The FTP application is a time-tested, standard application that is native to every Unix workstation. In the separation phase of the process of the present invention, 256 Kb file 10 is segmented into 64 Kb packets 20, 30, 40, and 50 as in the prior art. A separation/combination log 90 is prepared in sender 60. Packets 20, 30, 40, and 50 and log 90 are simultaneously transmitted in separate FTP sessions. Packets 20–50 are recombined in receiver 70 into file 10 according to the information in log 90.

The sequence of events is as follows. The data to be downloaded is prepared at the server and log 90 is generated. The data preparation step consists of breaking up the data into smaller pieces, naming the pieces packets 20–50, etc., followed by recording the packet names, server name, and combination algorithm to log file 90. The next step is for a separate "client" utility containing the simultaneous FTP algorithm to be invoked from a remote location. The "client" utility then downloads log file 90, obtains from it the details of the distribution to be downloaded, and then downloads the individual packets 20–50, etc. Following the download, the "client" utility then recombines the individual packets 20–50 back into the data's original form as file 10. The following paragraphs describe this sequence in further detail.

The process begins by breaking original data file 10 into smaller pieces. The breakdown can be carried out by various methods. To ensure the integrity of the transmission, it is important that the method by which the data is broken down be exactly reversed upon completion of the transfer. For example, data file 10 can be split into 1000-line pieces using the Unix "split" command:

% split target target_sub

This example splits the file named "target" into 1,000-line pieces respectively named target_subaa, target_subab, target_subac, etc. The number of pieces depends on the size of the original file. After the data is broken into pieces, the algorithm by which the data is broken up must be noted in log file 90. When transmission is completed, the data packets are rejoined into a single file with the Unix "cat" command:

```
% cat target_subaa target_subab target_subac>target
```

Either the exact command is specified in the log file or the algorithm is given a representative name, such as "split and cat".

Log 90 further specifies:

1. The server location information. This includes the hostname and the internet address of the server from which file 10 is sent. This information also includes the location of the distribution on the server file system, for example: "/s/crest/download".

2. The convention by which packets 20–50, etc., are named and ordered, so that they can be recombined to form the original file 10 after transmission. The naming refers to the filename and order of packets 20–50. Using our original file name of "target", log 90 would then contain the filenames and order of the pieces "target" was broken into, for example, target_subaa, target_subab, . . . target_suban. This convention ensures the simultaneous FTP "get" commands acquire the correct data packets.

3. The method used to segment the data in file 10, such as "split and cat".

Thus an example of log 90 would be

```
Opau.mhpcc.edu
164.122.27.164
/s/crest/download
Target_subaa
Target_subab
. . .
Target_suban
Split then cat
```

The next step in the process executes the client utility from a location remote from the data. The client utility first downloads log 90 to guide the FTP algorithm. Simultaneous FTP sessions to transfer packets 20–50 are performed by a combination of automating FTP sessions and processing each session in the background. FTP sessions can be automated (see "FTP manual pages", SunOS Release 4.1, January 1988) by directing the FTP command "set" to an FTP process, as illustrated in the following command:

```
% ftp -n < $ftp_command_set,
where $ftp_command_set is:         For example:
    open $destination_machine          open opau.mhpcc.edu
    user $username $password           user fabozzi fab1pass
    bin                                bin
    get $filename                      get target_sub.1
    close                              close
```

The FTP algorithm invokes a series of "n" ftp commands, each one of which downloads a different file from the server.

After separation/combination log 90 and all of the data in packets 20–50 have been downloaded, log 90 is used to recombine the data in packets 20–50 into its original form as file 10.

This method can be implemented by any user on any platform he wishes to transport data from or to. The user himself establishes separation/combination log 90, thereby leveraging the native FTP application that is bundled on every computer workstation. This method quickly becomes more advantageous over conventional transfers as file sizes increase over 5 Mb and transfer distance increases between sending and receiving computers.

Figure 3:
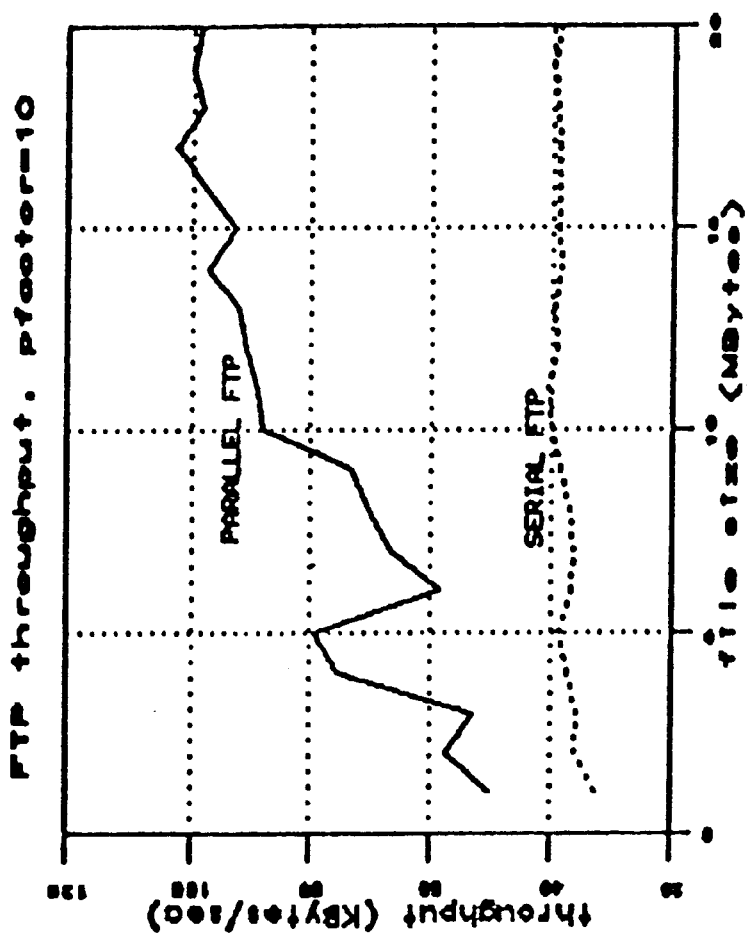
FIG. 3 shows a comparison between actual transfers of large files by the serial methods of the prior art and the parallel method of the present invention.

Referring to FIG. 3, the present invention was tested between a first host at the Maui High Performance Computing Center, in Maui, Hi., and a second host at Rome Laboratory, in Rome N.Y. Data was compiled for transfers of files with sizes ranging from 1–20 Mb to compare rates between serial and parallel transmissions. As the graph in FIG. 3 makes clear, when the number of packets transmitted in parallel is set to 10, the present invention yields a significant increase in throughput over the serial transfers of the prior art.

Clearly many modifications and variations of the present invention are possible in light of the above teachings. It should therefore be understood that, within the scope of the inventive concept, the invention may be practiced otherwise than as specifically claimed.

What is claimed is:

1. A method using a file transfer protocol to transfer, without regard to a user's privilege, files between remote computers, comprising:

segmenting a file within a server system into a plurality of data packets to be transmitted to a remote receiving computer;

recording in a log (1) information identifying each of said plurality of data packets and its order in said file, (2) server identification, and (3) at least one method of segmenting and recombining said file;

invoking at said remote receiving computer a shell written around an operating system that enables simultaneous transfers via said file transfer protocol;

transmitting said log to said remote receiving computer prior to transmitting said data packets from said server system;

analyzing said log at said remote receiving computer;

transmitting in parallel said plurality of data packets to said remote receiving computer using said file transfer protocol; and recombining said data packets according to said information and converting said data packets into said file's original form by means of said at least one method of segmenting and recombining.

2. The method of claim 1 wherein said step of recording includes recording to said log a hostname and an internet address of said server system from which said file is sent.

3. The method of claim 1 further comprising a step of combining automated sessions using a file transfer protocol and processing in the background.

4. A system using a file transfer protocol to transfer, without regard to a user's privilege, files between remote computers, comprising:

means for segmenting a file within a server system into a plurality of data packets to be transmitted to a remote receiving computer;

means for recording in a log (1) information identifying each of said plurality of data packets and its order in said file, (2) server identification, and (3) at least one utility effective for segmenting and recombining said file;

means for invoking at said remote receiving computer a shell written around an operating system to enable simultaneous transfers via said file transfer protocol;

means for transmitting said log to said remote receiving computer prior to transmitting said data packets from said server system;

means for analyzing said log at said remote receiving computer;

means for transmitting in parallel said plurality of data packets to said remote receiving computer using said file transfer protocol; and means for recombining said data packets according to said information and converting said data packets into said file's original form by means of said at least one method of segmenting and recombining.

5. The system of claim 4 wherein said means for recording includes means for recording to said log a hostname and an internet address of said server system from which said file is sent.

6. The: system of claim 4 further comprising means for combining automated sessions using a file transfer protocol and processing in the background.

* * * * *